United States Patent [19]

Seidner et al.

[11] Patent Number: 5,691,797
[45] Date of Patent: *Nov. 25, 1997

[54] MULTIFOCAL CONTACT LENS

[75] Inventors: Leonard Seidner, Manalapan, N.J.; Maurice Poster, Jericho, N.Y.

[73] Assignee: Permeable Technologies, Inc., Morganville, N.J.

[*] Notice: The term of this patent shall not extend beyond the expiration date of Pat. No. 5,619,289.

[21] Appl. No.: 588,638

[22] Filed: Jan. 19, 1996

Related U.S. Application Data

[63] Continuation-in-part of Ser. No. 308,065, Sep. 16, 1994, Pat. No. 5,619,289, which is a continuation-in-part of Ser. No. 40,422, Mar. 31, 1993, Pat. No. 5,404,183, Ser. No. 111,845, Aug. 25, 1993, Pat. No. 5,493,350, and Ser. No. 201,699, Feb. 25, 1994, Pat. No. 5,526,071, which is a continuation-in-part of Ser. No. 40,422, said Ser. No. 111,845, is a continuation-in-part of Ser. No. 40,422.

[51] Int. Cl.$^6$ ................................................. G02C 7/04
[52] U.S. Cl. ................................. 351/161; 351/160 H
[58] Field of Search ............................ 351/161, 160 R, 351/160 H

[56] References Cited

U.S. PATENT DOCUMENTS

| | | | |
|---|---|---|---|
| 3,482,906 | 12/1969 | Volk | 351/161 |
| 3,950,082 | 4/1976 | Volk | 351/169 |
| 4,418,991 | 12/1983 | Breger | 351/161 |
| 4,525,043 | 6/1985 | Bronstein | 351/161 |
| 4,580,882 | 4/1986 | Nuchman et al. | 351/161 |
| 4,636,049 | 1/1987 | Blaker | 351/161 |
| 4,640,595 | 2/1987 | Volk | 351/161 |
| 4,752,123 | 6/1988 | Blaker | 351/161 |
| 4,765,728 | 8/1988 | Porat et al. | 351/161 |
| 4,883,350 | 11/1989 | Muckenhirn | 351/160 R |
| 4,890,912 | 1/1990 | Visser | 351/161 |
| 4,936,672 | 6/1990 | Capez | 351/161 |
| 4,971,432 | 11/1990 | Koeniger | 351/161 |
| 5,002,382 | 3/1991 | Seidner | 351/161 |
| 5,024,517 | 6/1991 | Seidner | 351/161 |
| 5,046,836 | 9/1991 | Volk | 351/219 |
| 5,089,024 | 2/1992 | Christie et al. | 623/6 |
| 5,112,351 | 5/1992 | Christie et al. | 351/161 |
| 5,125,729 | 6/1992 | Mercure | 351/161 |
| 5,158,572 | 10/1992 | Nielsen | 623/6 |
| 5,181,053 | 1/1993 | Brown | 351/161 |
| 5,200,773 | 4/1993 | Volk | 351/160 R |
| 5,229,797 | 7/1993 | Futhey et al. | 351/168 |
| 5,349,395 | 9/1994 | Stoyan | 351/161 |
| 5,365,701 | 11/1994 | Brown | 451/28 |
| 5,485,228 | 1/1996 | Roffman et al. | 351/161 |

FOREIGN PATENT DOCUMENTS

WO8902251  3/1989  WIPO ..................... 351/161

*Primary Examiner*—David C. Nelms
*Assistant Examiner*—Jordan M. Schwartz
*Attorney, Agent, or Firm*—McAulay Fisher Nissen Goldberg & Kiel, LLP

[57] ABSTRACT

A multifocal contact lens customized for a patient has an anterior side with a power curve defined in part by (i) a central spheric aspheric surface, (ii) an inner annular spheric surface contiguous with the central aspheric surface, (iii) a second annular spheric surface contiguous along a radially inner periphery with the inner annular spheric surface, and (iv) an outer annular spheric surface contiguous along a radially inner periphery with the second annular spheric surface. Each of the annular spheric surfaces is concentric or coaxial with the central aspheric surface. The central aspheric surface corresponds to a distance vision correction zone. The inner annular spheric surface is an spheric surface corresponding to an intermediate vision correction zone. The second annular spheric surface corresponds to a near vision correction zone, and the outer annular spheric surface corresponds to a distant vision correction zone.

21 Claims, 3 Drawing Sheets

MULTIFOCAL CONTACT LENS

CROSS-REFERENCE TO RELATED APPLICATIONS

This application is a continuation-in-part of application Ser. No. 08/308,065 filed Sep. 16, 1994 now U.S. Pat. No. 5,619,289, which in turn is a continuation-in-part of application Ser. No. 08/040,422 filed Mar. 31, 1993, now U.S. Pat. No. 5,404,183, application Ser. No. 08/111,845, filed Aug. 25, 1993, now U.S. Pat. No. 5,493,350, and application Ser. No. 08/201,699 filed Feb. 25, 1994, now U.S. Pat. No. 5,526,071. Application Ser. No. 08/111,845 now U.S. Pat. No. 5,493,350, is a continuation-in-part of application Ser. No. 08/040,422, now U.S. Pat. No. 5,404,183, while application Ser. No. 08/201,699 now U.S. Pat. No. 5,526,071, is a continuation-in-part of application Ser. No. 08/040,422 now U.S. Pat. No. 5,404,183, and application Ser. No. 08/111,845 now U.S. Pat. No. 5,493,350.

BACKGROUND OF THE INVENTION

This invention relates to a multifocal contact lens.

Bifocal contact lenses are designed to correct or compensate for a condition of advancing age known as "presbyopia." In a presbyopic eye, the ability to focus at near distances, such as the normal reading distance, and in some cases at intermediate distances, is diminished. The loss of focusing capability is due to hardening of the eye's natural crystalline lens material.

Generally, multifocal contact lenses (usually either bifocal, trifocal or aspheric) are concentric or segmented in configuration. In a conventional bifocal contact lens of the concentric type, a first, centrally located, circular correction zone constitutes either distant or near vision correction, while a second annular correction zone surrounding the first zone provides the corresponding near or distance vision correction, respectively. In a conventional bifocal contact lens of the segmented or translating type, the lens is divided into two somewhat D-shaped zones. Usually the upper area is for distance vision correction, whereas the lower area is for near vision correction. Such conventional segmented contact lenses require some sort of movement of the lens relative to the eye to achieve acceptable visual acuity for both distant and near vision.

One accepted method of fitting contact lenses is based on taking so called K readings (which measure the center of the cornea) and fitting the center of the contact lens in a predetermined relationship to those readings. This, however, is not the only method of fitting contact lenses.

In all conventional bifocal fitting techniques, the bifocal or multifocal contact lenses is optimally designed to be particularly positioned on the cornea. However, it is very difficult in many cases, to position the lens to achieve the required fit. In general, the hardest part of fitting a lens is to position the lens at a desired location on the patient's cornea.

Precise fitting of a bifocal contact lens to the eye is crucial in so called simultaneous vision contact lenses where the brain receives both near and far vision input and selects between the near vision input and the far vision input, depending on the desired object(s) of perception.

As mentioned above, the segmented bifocal contact lenses translate to some extent on the eye. Such lenses cannot be locked onto the cornea. However, for good vision, some stability is necessary.

OBJECTS OF THE INVENTION

An object of the present invention is to provide a multifocal contact lens.

Another particular object of the present invention is to provide such a multifocal contact lens which is made from a polymer material which provides at least about 10% by weight water after hydration.

Yet another object of the present invention is to provide such a lens which has at least one spheric or aspheric posterior surface, or a combination of spheric and aspheric surfaces.

These and other objects of the present invention may be gleaned from the drawings and detailed descriptions set forth herein.

SUMMARY OF THE INVENTION

A multifocal contact lens customized for a patient has, in accordance with the present invention, an anterior side with a power curve defined in part by (i) a central surface, (ii) an inner annular surface contiguous with the central surface, (iii) a second annular surface contiguous along a radially inner periphery with the inner annular surface, and (iv) an outer annular surface contiguous along a radially inner periphery with the second annular surface. Each of the annular surfaces is concentric or coaxial with the central surface. Preferably, the central surface corresponds to a distance vision correction zone, while the inner annular surface corresponds to an intermediate vision correction zone, the second annular surface corresponds to a near vision correction zone, and the outer annular surface corresponds to a distant vision correction zone.

In accordance with another feature of the present invention, at least one of the vision correction zones of the lens is an aspheric zone. In one specific embodiment of the invention, the central zone is an aspheric zone with a standard eccentricity between approximately −0.6 and approximately −1.0, preferably approximately −0.8. One or more of the annular zones may be spheric zones. For example, all of the annular vision correction zones may be spheric. Or, alternatively, the inner annular surface may be aspheric and the second and outer annular surfaces spheric.

According to other features of the present invention, the central surface has a diameter between approximately 1.5 mm and approximately 2.5 mm, the inner annular surface has an outer diameter between approximately 2.0 mm and approximately 3.5 mm, the second annular surface has an outer diameter between approximately 2.3 mm and approximately 4.5 mm, and the outer annular surface has an outer diameter between approximately 3.5 and approximately 8.0 mm. In one specific embodiment of the invention, the central surface has a diameter of approximately 2.2 mm, the inner annular surface has an outer diameter of approximately 2.8 mm, the second annular surface has an outer diameter of approximately 3.5 mm, and the outer annular surface has an outer diameter of approximately 8.0 mm.

The anterior side of the lens may have an annular lenticular area with an inner periphery contiguous with the outer annular surface and with an outer diameter between approximately 8.0 mm and approximately 14.5 mm.

It is contemplated that the multifocal contact lens has a cornea-fitting posterior surface which has an eccentricity magnitude ranging from 0.0 to about 1.5 and including 0.0.

A multifocal contact lens in accordance with the present invention may be manufactured from hydrophilic or soft (hydrogel) polymeric materials i.e., polymeric materials which contain at least about 10% by weight water after hydration, such as disclosed in U.S. Pat. Nos. 5,314,960 and 5,314,961, the disclosure of which is hereby incorporated by reference.

In accordance with an additional feature of the present invention, where the central surface is aspheric, it has a maximum change in power of approximately 1 diopter from the center radially outwardly to the peripheral edge.

The present invention relies in part on a method for preparing a customized soft or hydrophilic multifocal contact lens wherein a standard diagnostic hydrophilic contact lens having a predetermined refractive power for distance vision is first placed on the patient's eye and allowed to seat itself in a natural position. The hydrophilic lens of the present invention will generally seat itself in a substantially centered position (which term shall include a somewhat off-centered position).

In one step of the method, an over-refraction is performed using the diagnostic lens in its natural position on the patient's cornea to determine a spheric or aspheric power curve which may be applied to a first portion or area of a prescription multifocal contact lens to provide optimal distance vision for the patient. In another step, a further over-refraction is performed to determine a second spheric or aspheric curve to provide near vision for the patient. As discussed above, the distance vision area may be a central area of the lens, while the near vision area is an annular area concentric or coaxial with the central area. Alternatively, the central zone may be a near vision correction zone, while distance vision is corrected by an annular zone located concentrically or coaxially with respect to the central zone. In both cases, a further distance vision correction zone may be provided next to a lenticular area of the lens. The refractive power of this additional zone may be defined in part by a spheric or aspheric surface on the anterior side of the lens conforming to the prescription needs of the individual patient. In any event, the outer distance vision correction zone is effective to assist in the correction of distance vision under low levels of illumination, for example, during night driving.

The patient is fitted with a lens having the same posterior profile as the diagnostic lens and an anterior profile with two or more concentric or coaxial power surfaces. The anterior power curve will generally comprise at least two and may comprise as many as four spheric and/or aspheric curves to provide adequate vision for near, intermediate and far distances. In certain instances, such as in mature presbyopes, in order to accommodate near, intermediate and distance vision, the prescription lens preferably will comprise central, paracentral and peripheral spheric curves, each having a clinically determined power or curvature, on the anterior surface of the lens and a single posterior spheric or aspheric curve of predetermined eccentricity, or optionally and preferably, a spheric curve combined with an aspheric curve of predetermined eccentricity.

Upon placement of a diagnostic hydrophilic contact lens on the cornea of a patient's eye so that the fitting surface is in substantial alignment with the cornea, the diagnostic lens usually aligns itself with the cornea in a substantially centered position. In this position, the patient may have adequate distance vision. With the appropriate diagnostic lens in place, the patient's near vision will be determined. Over-refraction of the lens for near vision will indicate a power curve to be cut on the anterior side of this lens. The lens which is produced from this process will provide intermediate vision, in addition to near and distance vision. However, another over-refraction may be performed to determine the prescriptive strength of an intermediate vision correction zone located on the anterior side of the lens just outside of the central distance vision correction zone.

Generally, a diagnostic lens used in a fitting method in accordance with the present invention will have a plurality of concentric or coaxial areas with respective predetermined power curves on the anterior side of the lens.

The fitting or lens preparation method described above recognizes the difficulty of providing adequate multifocal hydrophilic contact lenses. However, instead of struggling to achieve absolute corneal centering, as some fitting techniques attempt, the instant method obviates the difficulty by assuming that the greatest majority of fitted multifocal lenses will be centered or slightly off-centered on the cornea. In a method in accordance with the present invention, the diagnostic lens positions itself in its natural position, which, in hydrophilic lenses, is centered or substantially centered (slightly off-center). Because the finished lens has the same back surface design as the diagnostic lens, there is no need to further position either the diagnostic lens or the finished product, which should naturally position the same way as the diagnostic lens.

The present invention recognizes that each cornea is different and, instead of molding or fitting a lens precisely to center on the eye, the instant contact lens preparation technique selects among a fixed number of prescribed standard fitting or diagnostic lenses and then modifies only the anterior surface in order to achieve an optimal multifocal vision. This method can change differential powers of the two or more concentric or coaxial anterior spheric zones without appreciably affecting the fit.

Whenever one refracts over such a lens on the eye using spheric ophthalmic lenses, the patient subjectively chooses that ophthalmic lens power combined with the multiplicity of lens powers in the spheric central zone of the contact lens which provides the best acuity of vision at both far distance and near distance. There is a cortical interpretation of the independent images to determine the best acceptable summation of images.

The present invention may be used with all standard contact lens materials, i.e. rigid (gas permeable or PMMA), but is preferably used with soft (hydrogel) polymeric materials i.e., polymeric materials which contain at least about 10% by weight water after hydration, such as disclosed in U.S. Pat. Nos. 5,314,960 and 5,314,961.

DETAILED DESCRIPTION

Figure 1:
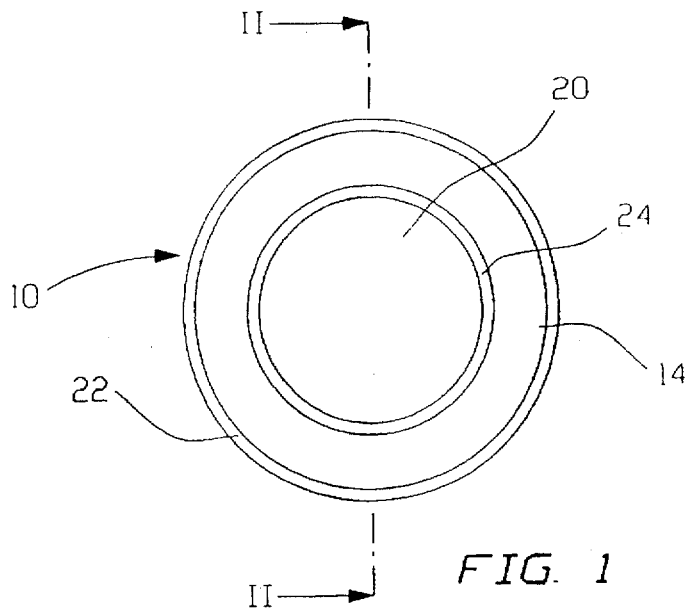
FIG. 1 is a schematic front elevational view of a diagnostic contact lens for use in fitting a patient with a simultaneous type multifocal contact lens.
Figure 2:
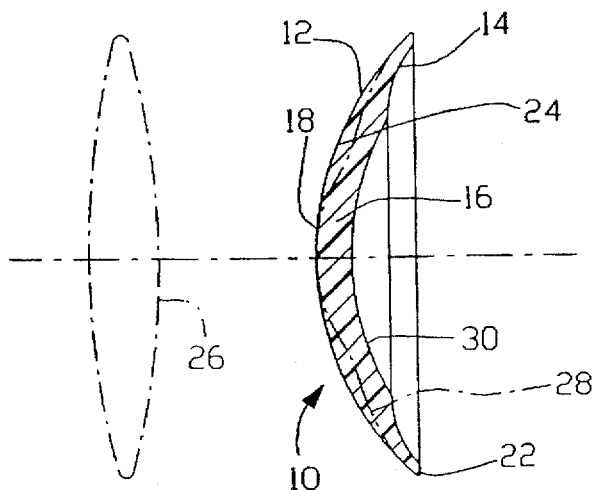
FIG. 2 is a cross-sectional view taken along line II—II in FIG. 1, showing in phantom lines an ophthalmic lens positioned in front of the diagnostic lens for fitting purposes.

In preparing a customized multifocal contact lens, a standard diagnostic contact lens 10 as illustrated in FIGS. 1 and 2 is first placed on the patient's eye and allowed to seat itself in a natural, substantially centered, position. The anterior side of the lens has a plurality of concentric or coaxial aspheric surfaces essentially alignable with the cornea of the patient's eye. The posterior side of the lens is formed with a spheric or aspheric surface which is adapted to fit the lens to the cornea of the patient. If, upon placement on the patient's cornea, the diagnostic lens does not produce adequate distance vision, a first over-refraction is performed to determine a first aspheric power curve for a central anterior zone of the lens. This central power curve is responsible for correcting distance vision and is provided by modifying a central portion of the anterior surface of a finished prescription lens having the same posterior surface as the diagnostic lens 10. An additional over-refraction is then performed to determine a second power curve for an annular anterior area or zone of the lens to provide adequate near distance correction. The second power curve is formed by modifying an annular portion of the anterior surface of the finished prescription lens. A third, spheric, power curve is provided in an annular, outer area of the finished lens to assist in the correction of distance vision under low levels of illumination, for example, during night driving. Generally, an anterior surface of the lens will have only two anterior annular aspheric power curves. In other cases, the anterior surface may have more than two aspheric power curves.

As described in detail hereinafter, if the above discussed procedure fails to provide satisfactory near and distance vision, a different diagnostic lens may be used to determine aspheric power curves where the central zone on the anterior side of the lens is a near vision correction zone, while a first annular area is a distance vision correction zone.

Figure 3:
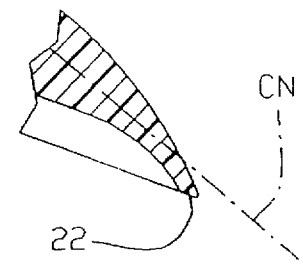
FIG. 3 is a partial cross-sectional view, on an enlarged scale, of the ophthalmic lens of FIG. 2, showing an edge bevel.

As shown in FIG. 1 and 2, a first diagnostic lens 10 tried on the patient has a concave cornea-fitting posterior surface 14. Surface 14 may be spheric or preferably, aspheric with a predetermined eccentricity ranging from 0.0 to about 1.5. Lens 10 also has, on an anterior side, a standard annular spheric or aspheric surface 12 and a standard central aspheric surface 18, each surface having a predetermined eccentricity. Generally, surfaces 12 and 18 have different eccentricities. However, it is also possible for them to have the same eccentricity. In addition, this first diagnostic lens may have, at an annular periphery of lens 10, an edge radius 22 (FIGS. 2 and 3) which is turned to the side of a center line CN. Accordingly, by virtue of the use of an aspheric surface, surface 14 of the lens is curved down to fit against the cornea of the patient's eye. It is noted that the edge radius is an optional feature of the lens.

In fitting a patient with a multifocal contact lens, diagnostic lens 10 is placed on the cornea of the patient's eye so that cornea-fitting posterior surface 14 is in substantial contact with the cornea. Lens 10 is allowed to align itself with the cornea in a substantially centered position. Upon an alignment of diagnostic contact lens 10 in the substantially centered position, a series of conventional diverging or converging spheric opthalmic test lenses 26 (FIG. 2) are disposed before the lens 10 on the patient's eye to determine a power curve 28 (FIG. 2) with which anterior surface 18 of a central lens portion 16 can be formed to provide optimal distance vision for the patient. A subsequent over-refraction is performed to determine a spheric or aspheric power curve with which annular surface 12 of the lens may be formed to provide optimal near vision for the patient.

To optimize the fitting of lens 10 to any particular patient's cornea, lens 10 is first selected from a kit of standard diagnostic contact lenses each having concave cornea-fitting posterior surface 14 and central lens portion 16 with predetermined annular spheric or aspheric surface 12 and predetermined central aspheric surface 18. Surface 18 has a predetermined standard eccentricity between approximately 0.40 and approximately 1.80 and preferably between approximately 0.6 and 1.0.

Most of the lenses 10 in the kit have cornea-fitting posterior surfaces 14 which are spheric or aspheric with eccentricities between 0.0 and about 1.5.

The patient is fitted first with a diagnostic or fitting contact lens 10 having a posterior surface 14 which substantially matches the cornea of the patient about the iris. Of course, precise matching is undesirable, because space is required for tear flow, etc.

Two or more different standard diagnostic contact lenses 10 may be tested sequentially on the cornea of the patient to determine which has the most appropriate cornea-fitting surface 14 and anterior surfaces 12 and 18. However, a suitable diagnostic lens may be preselected inasmuch as appropriateness of surfaces 12 and 18 depends in large part on the needs of the particular patient, for example, on whether the lens is to be used primarily for reading, primarily in social situations, or primarily for distance vision correction.

Upon the selection of a diagnostic lens 10 which has a suitable cornea-fitting surface 14 and which provides the best distance vision, a first over-refraction is performed, if necessary, to determine an aspheric power curve 28 with which the central area 18 of the lens is formed to optimize the correction for distance vision. The same over-refraction procedure may be used to determine a spheric power curve with which an outer area of the lens may be formed to provide further distance vision correction.

A second over-refraction procedure is subsequently performed to determine a power curve for modifying annular spheric or aspheric surface 12 of central portion 16 for the final lens to provide adequate near vision. This over-refraction procedure is performed with the patient focusing on a near object. Upon the determination of an appropriate near vision power curve, the appropriate spheric or aspheric curve is formed on the anterior side of a prescription lens having the same posterior configuration as the diagnostic lens. This lens, once manufactured to the prescription established by the diagnostic procedure should provide adequate near, distance and intermediate vision. However, as discussed below with reference to FIG. 7, intermediate vision may be corrected by a paracentral aspheric progressive-add surface on the anterior side of the lens.

Figure 5:
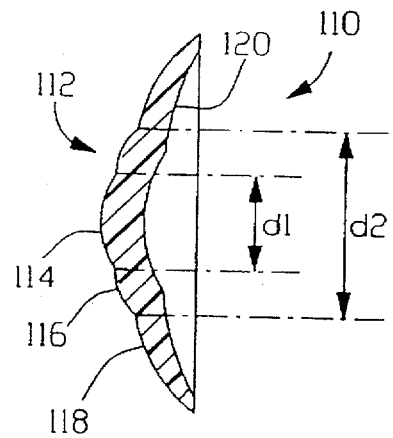
FIG. 5 is a schematic cross-sectional view of a multifocal contact lens.

Generally, as illustrated in FIG. 5, a multifocal contact lens 110 customized for a patient pursuant to the above-described fitting methodology will have an anterior side 112 with a power curve defined in part by a central aspheric surface 114 and at least one annular aspheric surface 116 concentric or coaxial therewith. Where central aspheric surface 114 corresponds to a distance vision correction zone, it will have a standard eccentricity value between about −0.6 and about −1.2 and, more preferably, between about −0.75 and about −0.85. In lens 110, annular aspheric surface 116 corresponds to a progressive-add correction zone and has a standard eccentricity value between about −1.35 and about −2.5. The negative eccentricities mean that the deviations from spheric result in a radius of curvature which is smaller than, or reduced with respect to, a spheric radius. Conversely, where eccentricities are positive, the deviations from spheric result in a radius of curvature which is greater than, or increased with respect to, a spheric radius. Negative eccentricities thus correspond to a steepening of the power curve while positive eccentricities correspond to a flattening of the power curve.

As further illustrated in FIG. 5, anterior side 112 of lens 110 also has an annular outer area 118 with a spheric power surface providing an additional correction for distance vision. The power curve for outer area 118 is determined during the same over-refraction procedure used to determine the power curve for central aspheric surface 114.

Patient-customized lens 110 has a cornea-fitting posterior surface 120 which is either spheric or aspheric with an eccentricity value ranging from 0.0 to about 1.5. As discussed above, this posterior surface 120 has essentially the same form or profile as posterior surface 14 of the diagnostic lens 10 used to determine the power curves for surfaces 114, 116, and 118.

Preferably, central aspheric surface 114 has a diameter d1 between approximately 1.6 mm and approximately 2.3 mm, while annular aspheric surface 116 has a diameter d2 between approximately 2.9 mm and 3.6 mm. For example, central aspheric surface 114 may have a standard diameter of approximately 2.2 mm, while annular aspheric surface 116 has a standard diameter of approximately 3.0 mm or 3.5 mm. In some cases, the diameter of central aspheric surface 114 will be reduced to approximately 1.9 mm, for purposes of providing adequate vision enhancement.

Lens 110 may be manufactured from a hydrophilic polymer such as those disclosed in U.S. Pat. Nos. 5,314,960 and 5,314,961, the disclosures of which are hereby incorporated by reference.

As discussed above, in some cases, depending on the patient's reaction to the over-refraction procedure, central aspheric surface 114 of customized multifocal contact lens 110 corresponds to a near vision correction zone and has a standard eccentricity value between about 1.35 and about 2.5. Concomitantly, annular aspheric surface 116 corresponds to a distance vision correction zone having a standard eccentricity value between about 0.6 and about 1.2 and, preferably, between about 0.8 and about 0.9. In this embodiment also, annular outer area 112 is provided with a spheric power surface providing a distance vision correction.

It is to be noted that one eye of a patient may be provided with a lens 110 where central aspheric surface 114 is a distance vision correction zone, while the other eye of the patient is provided with a lens 110 where central aspheric surface 114 is a near vision correction zone. This is a kind of modified monovision, based on the same principles as those underlying the contact lens combinations disclosed in U.S. Pat. Nos. 5,002,382 or 5,024,517. Alternatively, where the central aspheric surfaces 114 of both contact lenses 110 correct distance vision and have standard eccentricity values between about −0.6 and about −1.2 and the annular aspheric surfaces correspond to progressive-add-type correction zones with standard eccentricity values between about −1.35 and about −2.5, the central aspheric surface of the lens for a dominant eye of the patient is larger in diameter than the central aspheric surface of the lens for a nondominant eye of the patient. In this case, the diameter of annular aspheric surface 114 of the dominant lens is substantially equal to the diameter of the annular aspheric surface of the nondominant lens. Specifically, the diameter of the central aspheric surface of the dominant lens is about 2.2 mm and the diameter of the central aspheric surface of the nondominant lens is about 1.9 mm, while the diameter of the annular aspheric surface of either lens is between about 3.0 mm and about 3.5 mm.

Figure 6:
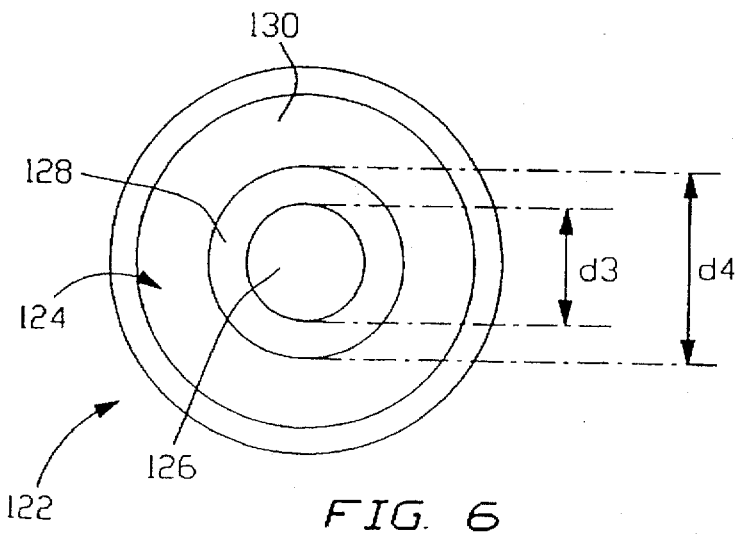
FIG. 6 is a schematic front elevational view, on an enlarged scale, of another multifocal contact lens.

As illustrated in FIG. 6, another customized multifocal contact lens 122 has an anterior side 124 with a power curve defined in part by a central aspheric surface 126 and two annular aspheric surfaces 128 and 130 concentric or coaxial therewith. Central aspheric surface 126 corresponds to an intermediate vision correction zone and has a standard eccentricity value between about 1.2 and about 1.7, while annular aspheric surface 128 corresponds to a distance vision correction zone with a standard eccentricity value between about 0.6 and about 1.2. Annular aspheric surface or outer area 130 corresponds to a near vision correction zone with a spheric power curve. Central aspheric surface 126 has a diameter d3 between approximately 1.5 mm and 2.0 mm, while annular aspheric surface 128 has a diameter d4 between approximately 3.0 mm and 3.7 mm. Again, lens 122 has a posterior profile or surface (not shown) which is the same as that of the diagnostic lens ultimately selected for determination of the powers of aspheric surfaces 126, 128, 130 during the over-refraction process. The eccentricity of the posterior surface, as well as the eccentricities of surfaces 126, 128, and 130, are standard values selectable from a plurality of predetermined eccentricities. Lens 122 is particularly well suited for mature presbyopes, in order to accommodate near, intermediate and distance vision.

To provide adequate vision correction without confusing visual perception of the patient, the maximum change in refractive power in a radially outward direction across any single distance vision correction zone (plan view) 114, 116, 118 (FIG. 5) or 128 (FIG. 6) should be no greater than approximately one diopter or, more preferably, one-half diopter. Thus, the change in refractive power from the center of a "center distance" lens 110 to the boundary between central distant-vision correction zone 114 and annular near vision correction zone 116 should be no greater than approximately one diopter or, more preferably, one-half diopter. Similarly, the change in refractive power across the width of annular distance vision correction zone 116 of a "center near" lens generally should be no greater than approximately 1 diopter or, more preferably, one-half diopter. In addition, the change in eccentricity from one correction zone to the next should be gradual, to reduce stress on the eye. Thus, in certain instances two aspheric curves may suffice to provide adequate multifocal vision and in other instances, one or more additional aspheric surfaces of varying eccentricity will be used to provide the gradual change between zones to accommodate the patient's vision.

In order to secure acceptable distance vision and near vision in a multi-focal contact lens pursuant to the above-described procedure, particularly where there is a signficant difference in "add" between the prescription or power curve for distance vision and the prescription or power curve for near vision, the lens may be formed to float or translate slightly on the cornea to an extent greater than normal. Thus, in the case of a contact lens having two anterior aspheric surfaces, a steeper part of the power curve may be shifted over the pupil for near vision. In the case of a lens with a third, paracentral anterior aspheric surface, the slight translation of the lens may serve to shift the lenticular area more squarely over the pupil for near vision.

Figure 7:
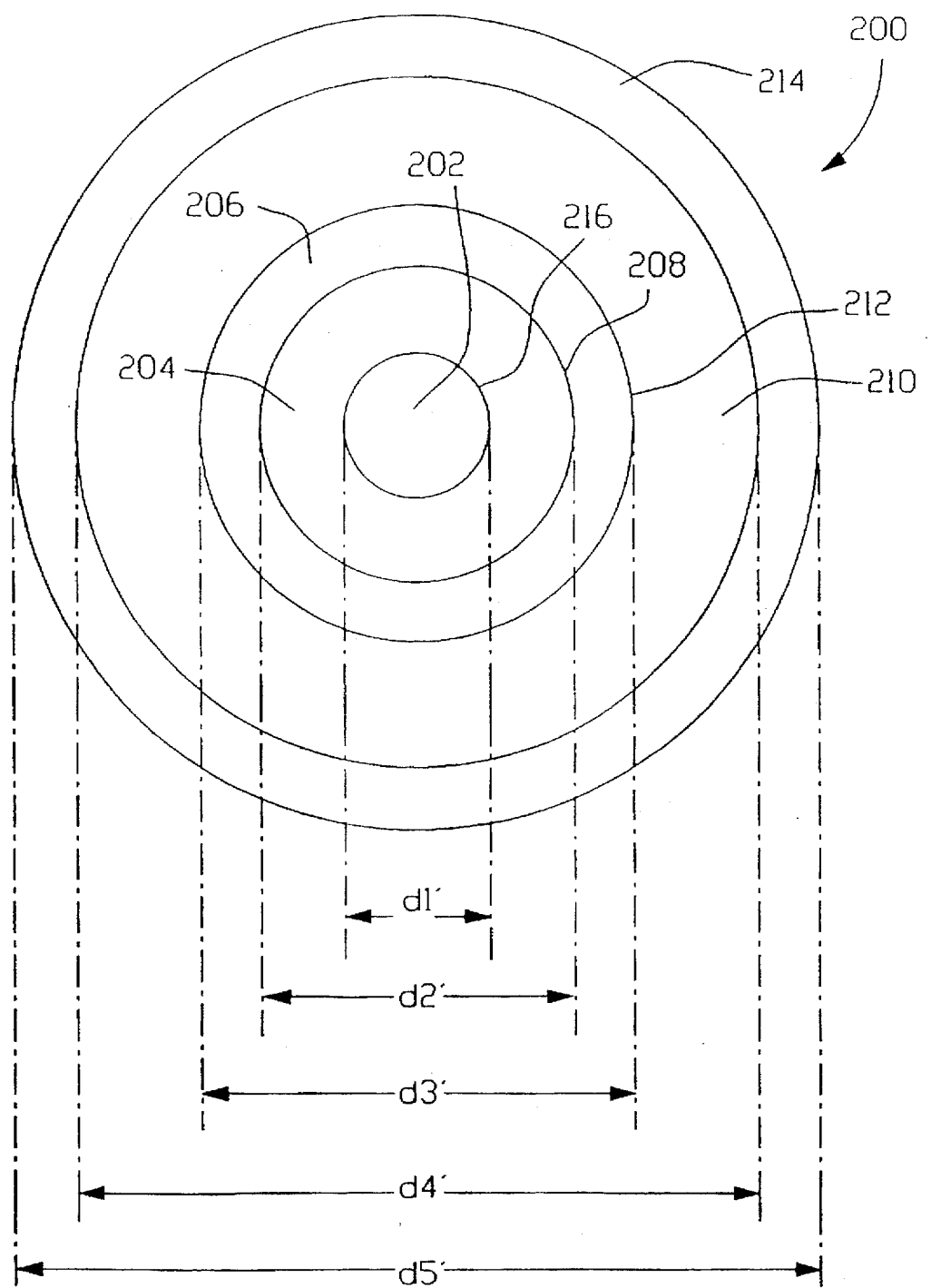
FIG. 7 is a schematic front elevational view, on an enlarged scale, of a multifocal contact lens.

As depicted in FIG. 7, a multifocal contact lens 200 customized for a patient has an anterior side with a power curve defined in part by a central surface 202, an inner annular surface 204 contiguous with central surface 202, a second annular surface 206 contiguous along a radially inner periphery 208 with inner annular surface 204, and an outer annular surface 210 contiguous along a radially inner periphery 212 with second annular surface 206. Each of the annular surfaces 204 and 210 is concentric or coaxial with central surface 202. Central surface 202 corresponds to a distant vision correction zone, while inner annular surface 204 corresponds to an intermediate vision correction zone, second annular surface 206 corresponds to a near distance correction zone and outer annular surface 210 corresponds to another distant vision correction zone.

Central surface 202 has a diameter d1' between approximately 1.5 mm and approximately 2.5 mm, while inner annular surface 204 has an outer diameter d2' between approximately 2.0 mm and approximately 3.5 mm. Second annular surface 206 has an outer diameter d3' between approximately 2.3 mm and approximately 4.5 mm, and outer annular surface 210 has an outer diameter d4' between approximately 3.5 and approximately 8.0 mm. An annular lenticular area 214 of lens 200 has no power curve and has an outer diameter d5' between approximately 8.0 mm and approximately 14.5 mm. Central surface 202 has a standard eccentricity between approximately −0.6 and approximately −1.0 and more preferably between about −0.75 and about −0.85.

Each power surface 202, 204, 208 and 210 may be either aspheric or spheric. In one specific embodiment, central surface 202 and inner annular surface 204 are both aspheric surfaces, with inner annular surface 204 corresponding to a progressive add zone having a standard eccentricity between approximately −1.5 and approximately −5.0 and, more preferably between approximately −3.0 and approximately −5.0. In this embodiment, annular surfaces 206 and 210 may be spheric or aspheric.

In a particular geometrical configuration of this specific corneal contact lens, diameters d1' through d5' are approximately 2.2 mm, approximately 2.8 mm, approximately 3.5 mm, approximately 8.0 mm, and approximately 14.5 mm, respectively. Central surface 202 has an eccentricity of approximately −0.8, while inner annular surface 204 has a standard eccentricity of approximately −5.0.

Where central surface 202 is aspheric, it preferably has a maximum change in power of approximately 1 diopter from the center radially outwardly to its peripheral edge 216. Where inner annular surface 204 is an aspheric progressive-add zone, it preferably has a maximum change in refractive power of approximately three and one-half diopters as measured radially from edge 216 to periphery 208.

Multifocal contact lens 200 has a spheric or aspheric cornea-fitting posterior surface (not designated), with an eccentricity magnitude ranging between (and including) 0.0 and about 1.5.

Multifocal contact lens 200 may be manufactured from hydrophilic or soft (hydrogel) polymeric materials i.e., polymeric materials which contain at least about 10% by weight water after hydration, such as disclosed in U.S. Pat. Nos. 5,314,960 and 5,314,961, the disclosure of which is hereby incorproated by reference.

Central surface 202 corrects distance vision particularly under conditions of high illumination, while outer annular surface 210 corrects distance vision particularly under conditions of low illumination such as night driving. Surface 204 corrects vision for intermediate distances.

Lens 200 is fitted as described above, using a diagnostic or test lens with the same posterior surface as lens 200 and an anterior side with a central spheric or aspheric surface of a predetermined standard eccentricity and power and at least one annular spheric or aspheric surface of a predetermined standard eccentricity and power. Power curves for central surface 202 and outer annular surface 210 are determined, as discussed above, during a first over-refraction procedure wherein a diagnostic or test lens is placed on the cornea of the patient's eye. A power curve for second annular surface 206 is determined during a second over-refraction procedure. The power curves for central surface 202 and outer annular surface 210 may be determined under high illumination and low illumination levels, respectively. The power curve for paracentral or progressive-add surface 204 is determined by the preselected standard eccentricity of that intermediate zone and by the results of the first (distant vision) over-refraction procedure. Any progressive add zone (eccentricity of high magnitude) will provide a continuous range of powers to the retina and the brain of the patient. The patient's visual cortex selects from among that continuous range of powers or adds to obtain a focused sight.

It is to be noted that in some circumstances, the outer two annular surfaces or correction zones 206 and 210 may be omitted in a prescription lens. Such a simplified lens has only a central aspheric surface 202 and an annular progressive add surface or zone. The central aspheric surface has a diameter between about 1.5 mm and about 2.8 mm, while the annular progressive add zone has an outer diameter between about 1.5 mm and about 8.0 mm. The progressive add zone has a standard eccentricity having a magnitude between approximately 1.5 and approximately 5.0. Where the central aspheric surface corresponds to a distance vision correction zone, the annular surface is an aspheric surface corresponding to a progressive add zone with a standard eccentricity between approximately −1.5 and approximately −5.0.

In another modification of the contact lens of FIG. 7, only the outer annular zone 210 is omitted.

In another specific embodiment of the multifocal contact lens of FIG. 7, central surface 202 is aspheric while inner annular surface 204 is spheric instead of aspheric. In this embodiment, the inner annular surface still corresponds to an intermediate vision correction zone. The radius of curvature of spheric surface 204 is determined by an over-refraction procedure during a diagnostic evaluation as described in detail elsewhere herein.

In yet another specific embodiment of the multifocal contact lens of FIG. 7, all of the power curves are spheric, i.e., surfaces 202, 204, 206 and 210 are spheric surfaces with radii of curvature determined by over-refraction procedure during a diagnostic evaluation. In this alternative multifocal contact lens, the surfaces 202, 204, 206 and 210 still correspond to distance, intermediate, near, and distance vision corrections zones, respectively. The widths of the surfaces, in the radial direction, are as set forth above with reference to FIG. 7.

In an alternative lens having the general geometrical configuration described above with respect to FIG. 7, the central surface corresponds to an aspheric near vision correction zone with a standard eccentricity between approximately +1.5 and approximately +5.0 and preferably between approximately +3.0 and approximately +3.5, whereas the inner annular surface is aspheric with a standard eccentricity between approximately +1.5 and approximately +3.5 and preferably about +2.5. The second annular correction surface is also aspheric and has a standard eccentricity between approximately +0.3 and approximately +1.0 and preferably approximately 0.8. In such a lens, the central aspheric correction zone has a diameter between about 1.1 mm and about 2.2 mm, while the inner annular surface has an outer diameter between about 1.1 mm and about 2.5 mm. The second annular surface has an outer diameter between about 2.0 mm and 8.0 mm. Usually, a lens with a central near vision correction zone will have only three vision correction zones, although a fourth zone may be appropriate in some cases.

As illustrated in FIGS. 1 and 2, diagnostic lens 10 has at least one transition junction 24 where the anterior annular aspheric surface 12 meets central aspheric surface 18. At transition junction 24, the radii of curvature of surfaces 12 and 18 are approximately equal. However, the eccentricities of those aspheric anterior surfaces remain different.

An eccentricity between 0.0 and about 1.5 for cornea-fitting posterior surface 14 of a diagnostic hydrophilic lens or a finished prescription lens is in accordance with the generally aspheric topographical characteristics of the human cornea. With such an eccentricity, cornea-fitting posterior surface 14 is fitted relatively tightly to the patient's eye, so that the lens, which may move slightly with eye and eyelid movement, does not move significantly with movement of the upper eyelid.

Upon the completion of the over-refraction process, the patient is fitted with a prescription lens 110, 122, 200 (generally, from a lens production laboratory) which is substantially identical to the finally used diagnostic lens 10. The prescription lens may have two anterior aspheric surfaces (FIG. 5 or 7) or three (or more) anterior aspheric surfaces. The anterior surface of the selected lens blank is machined or, more specifically, lathed to produce the appropriate anterior surfaces 126, 128, 130 (FIG. 5) or 202, 204, 206, 210 (FIG. 7). Alternatively, either the posterior or anterior surface of the lens or the entire lens, including posterior and anterior surfaces, may be molded.

In most cases, over-refraction of diagnostic lens 10 will provide adequate vision for near, intermediate and far distances. In such a case, a lens having a posterior surface with a single spheric or aspheric curve 14 may be used with good success. In certain instances, it may be advantageous to provide a second aspheric surface (not shown) on the periphery of the cornea-fitting posterior surface 14, each of the aspheric posterior surfaces ranging in eccentricity from about 0.0 to about 1.5.

By incorporating the features of the contact lenses, it is now possible to avoid having to fit the patient in a rigid set or established position, thus obviating one of the more difficult problems of bifocal/multifocal contact lens fitting. Instead, the fit or position of the lens is first established naturally and thereafter, the visual characteristics of the lens are designed into the finished lens.

Generally, as is well known in the art, if the anterior power curve is decreased by 12 lines for each diopter, the add is 1.0. A decrease of 6 lines for each ½ diopter results in an add of 0.5, while a decrease of 24 lines for each 2 diopters results in an add of 2.0. Similarly, a decrease of 48 lines for each 4 diopters results in an add of 4.0. This rule of thumb is helping in guiding the practitioner to design a lens which can accommodate varying powers of the lens in predetermined distances for maximum fit and visual effectiveness.

Figure 4:
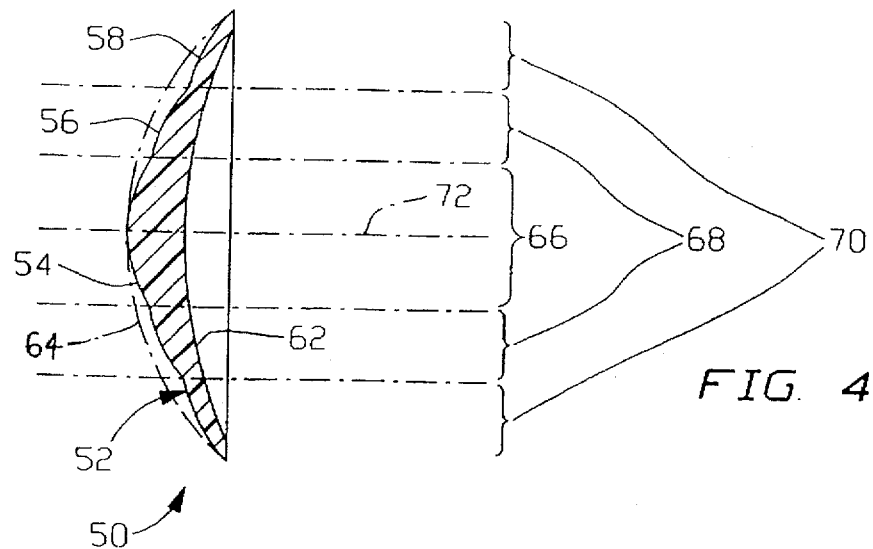
FIG. 4 is a schematic cross-sectional view of a multifocal contact lens.

FIG. 4 shows a special multifocal hydrophilic contact lens 50 with an optional enhanced intermediate vision correction. As illustrated in FIG. 4, a multifocal hydrophilic contact lens 50 has an anterior surface or side 52 with three concentric or coaxial aspheric surfaces 54, 56, and 58 each formed with a respective power curve having a standard eccentricity value between about 0.4 and about 2.5. The eccentricity values differ from one another by at least about 0.2 and by no more than about 0.8. Lens 50 has a concave cornea-fitting posterior surface 62 which includes at least one aspheric surface having an eccentricity value between about 0.0 and about 1.5.

Hydrophilic multifocal soft lens 50 may include one or more spheric or aspheric posterior surfaces, but preferably, lens 50 has one aspheric surface 62 ranging in eccentricity from about 0.0 to about 1.5. In certain embodiments of a contact lens, the posterior cornea-fitting surface of the contact lens may have two annular aspheric surfaces, each of which has an eccentricity value ranging from about 0.0 and about 1.5.

Central aspheric surface or power curve 54 provides distance vision and has an eccentricity value with a smaller magnitude than the magnitude of the eccentricity value of paracentral aspheric surface or power curve 56 which provides intermediate vision. The eccentricity of para-central aspheric surface or power curve 56 in turn has a magnitude which is smaller than the magnitude of the eccentricity of peripheral aspheric surface or power curve 58, which provides a correction for near vision. Preferably, the eccentricity value of central aspheric power curve 54 is between about −0.4 and about −0.8, the eccentricity value of para-central aspheric surface or power curve 56 is between about −0.6 and about −0.8, and the eccentricity value of peripheral aspheric surface or power curve 58 is between about −0.8 and about −1.2.

Aspheric surfaces or power curves 54, 56 and 58 are determined in a fitting method utilizing a diagnostic lens having the same posterior surface 62 as lens 50 and an anterior surface 64 having a predetermined standard refractive power. That refractive power is for distance vision. Alternatively, the diagnostic lens may have a plurality of concentric or coaxial areas with respective predetermined standard refractive powers, e.g., for distance vision and near vision, respectively. The diagnostic lens is selected from a kit of diagnostic lenses with different posterior surfaces 62 and different overall dimensions. The diagnostic lens is selected to conform to the particular shape and dimensions of a patient's cornea.

The diagnostic contact lens is placed on the cornea of a patient's eye so that posterior cornea-fitting surface 62 is in substantial contact with the cornea. The diagnostic contact lens is allowed to align itself with the cornea in a substantially centered position while the patient looks at an effectively distant object. Upon aligning of the diagnostic contact lens in the substantially centered position, a series of test lenses is disposed before the patient's eye in a first over-refraction procedure to determine central aspheric surface or power curve 54 for providing optimal distance vision for the patient. In another over-refraction step, while the patient looks at an effectively near object, another series of test lenses is disposed before the patient's eye to determine aspheric surface or power curve 58 for providing optimal near vision for the patient. In yet another over-refraction step, while the patient looks at an intermediately distanced object, a further series of test lenses is disposed before the patient's eye to determine aspheric surface or power curve 56 for providing optimal intermediate distance vision for the patient.

Anterior aspheric surfaces or power curves 54, 56, and 58 are located in a central correction zone 66, an intermediate annular correction zone 68, and a peripheral annular correction zone 70, respectively. Aspheric surfaces or power curves 54, 56, and 58 are concentric or coaxial with a lens axis 72. It is to be noted that the eccentricity values of surfaces or power curves 54, 56, and 58 differ from one another by no more than about 0.8 in order to provide a smooth transition from one correction zone 66, 68, or 70 to another.

A hydrophilic multifocal contact lens as depicted in FIG. 4 may have only a central correction zone 66 and a peripheral correction zone 70 with associated aspheric surfaces or power curves 54 and 58 for correcting distance vision and near vision, respectively. Alternatively, four aspheric surfaces or power curves may be provided, all ranging in eccentricity from about 0.4 to about 1.8, preferably from about 0.6 to about 1.0, each of the aspheric surfaces differing in eccentricity value within the range of about 0.2 to about 0.8.

It is to be noted that the change in eccentricity from aspheric surface or power curve 54 to aspheric surface or power curve 56, as well as the change in eccentricity from aspheric surface or power curve 56 to aspheric surface or power curve 58, should be gradual, to reduce stress on the eye.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are profferred by way of example to facilitate comprehension of the invention and should not be construed to limit the scope thereof.

What is claimed is:

1. A multifocal contact lens customized for a patient, having an anterior side with a power curve defined in part by (i) an aspheric central surface having a negative eccentricity with a magnitude between approximately 0.6 and approximately 1.0, (ii) an inner annular surface contiguous with said central surface, (iii) a second annular surface contiguous along a radially inner periphery with said inner annular surface, and (iv) an outer annular surface contiguous along a radially inner periphery with said second annular surface, each of the annular surfaces being concentric or coaxial with said central surface, said central surface corresponding to a distance vision correction zone, said inner annular surface corresponding to an intermediate vision correction zone, said second annular surface corresponding to a near vision correction zone, and said outer annular surface corresponding to a distant vision correction zone.

2. The lens defined in claim 1 wherein said central surface has an eccentricity of approximately −0.8.

3. The lens defined in claim 1 wherein said central surface has a center and a substantially circular peripheral edge, said central surface having a maximum change in power of approximately 1 diopter from said center radially outwardly to said peripheral edge.

4. The lens defined in claim 1 wherein said inner annular surface is an aspheric surface.

5. The lens defined in claim 4 wherein said second annular surface and said outer annular surface are both spheric surfaces.

6. The lens defined in claim 1 wherein said central surface has a diameter between approximately 1.5 mm and approximately 2.5 mm, said inner annular surface has an outer diameter between approximately 2.0 mm and approximately 3.5 mm, said second annular surface has an outer diameter between approximately 2.3 mm and approximately 4.5 mm, and said outer annular surface has an outer diameter between approximately 3.5 and approximately 8.0 mm.

7. The lens defined in claim 6 wherein said central surface has a diameter of approximately 2.2 mm, said inner annular surface has an outer diameter of approximately 2.8 mm, said second annular surface has an outer diameter of approximately 3.5 mm, and said outer annular surface has an outer diameter of approximately 8.0 mm.

8. The lens defined in claim 7 wherein said anterior side has an annular lenticular area with an inner periphery contiguous with said outer annular surface and with an outer diameter between approximately 8.0 mm and approximately 14.5 mm.

9. The lens defined in claim 8 further comprising a cornea-fitting posterior surface with an eccentricity magnitude in a range including 0.0 and extending between 0.0 and about 1.5.

10. The lens defined in claim 1 wherein at least one of said inner annular surface, said second annular surface, and said outer annular surface is a spheric surface.

11. The lens defined in claim 10 wherein said second annular surface is a spheric surface.

12. The lens defined in claim 10 wherein said outer annular surface is a spheric surface.

13. The lens defined in claim 10 wherein said inner annular surface, said second annular surface and said outer annular surface are all spheric surfaces.

14. The lens defined in claim 1 wherein said anterior side has an annular lenticular area with an inner periphery contiguous with said outer annular surface.

15. The lens defined in claim 1, further comprising a cornea-fitting posterior surface with an eccentricity magnitude in a range including 0.0 and extending between 0.0 and about 1.5.

16. The lens defined in claim 1 manufactured from a hydrophilic polymer.

17. A multifocal contact lens customized for a patient, having an anterior side with a power curve defined in part by (i) an aspheric central surface having a negative eccentricity with a magnitude between approximately 0.6 and approximately 1.0, (ii) an inner annular surface contiguous with said central surface, (iii) a second annular surface contiguous along a radially inner periphery with said inner annular surface, and (iv) an outer annular surface contiguous along a radially inner periphery with said second annular surface, each of the annular surfaces being concentric or coaxial with said central surface, said inner annular surface corresponding to an intermediate vision correction zone.

18. The lens defined in claim 17 wherein at least one of said inner annular surface, said second annular surface, and said outer annular surface is an aspheric surface.

19. The lens defined in claim 18 wherein at least one of said inner annular surface, said second annular surface, and said outer annular surface is a spheric surface.

20. The lens defined in claim 17 wherein at least one of said inner annular surface, said second annular surface, and said outer annular surface is a spheric surface.

21. The lens defined in claim 20 wherein said inner annular surface, said second annular surface, and said outer annular surface are all spheric surfaces.

* * * * *